United States Patent
Norrman et al.

(10) Patent No.: US 12,284,088 B2
(45) Date of Patent: Apr. 22, 2025

(54) METHODS, APPARATUS AND MACHINE-READABLE MEDIA RELATING TO MACHINE-LEARNING IN A COMMUNICATION NETWORK

(71) Applicant: Telefonaktiebolaget LM Ericsson (publ), Stockholm (SE)

(72) Inventors: Karl Norrman, Stockholm (SE); Martin Isaksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 17/635,235

(22) PCT Filed: Aug. 6, 2020

(86) PCT No.: PCT/EP2020/072123
§ 371 (c)(1),
(2) Date: Feb. 14, 2022

(87) PCT Pub. No.: WO2021/032498
PCT Pub. Date: Feb. 25, 2021

(65) Prior Publication Data
US 2022/0294706 A1    Sep. 15, 2022

Related U.S. Application Data

(60) Provisional application No. 62/887,861, filed on Aug. 16, 2019.

(51) Int. Cl.
*G06N 20/00*   (2019.01)
*H04L 41/0853*   (2022.01)
(Continued)

(52) U.S. Cl.
CPC ............ *H04L 41/16* (2013.01); *G06N 20/00* (2019.01); *H04L 41/0853* (2013.01); *H04L 41/14* (2013.01); *H04W 24/02* (2013.01)

(58) Field of Classification Search
CPC ..... H04L 41/16; H04L 41/0853; H04L 41/14; G06N 20/00; H04W 24/10; H04W 24/02
See application file for complete search history.

(56) References Cited

U.S. PATENT DOCUMENTS 10,824,474 B1 *  11/2020  Kamboj ................ G06F 9/5038
10,862,770 B2 *  12/2020  Lu .......................... H04L 67/61
(Continued)

OTHER PUBLICATIONS

International Search Report and Written Opinion of the International Searching Authority for PCT International Application No. PCT/EP2020/072122 dated Nov. 6, 2020.
(Continued)

*Primary Examiner* — Shirley X Zhang
(74) *Attorney, Agent, or Firm* — Sage Patent Group

(57) ABSTRACT

A method performed by a co-ordination network entity in a communications network includes transmitting a request message to a network registration entity in the communications network for identification information for a plurality of candidate network entities in the communications network capable of performing collaborative learning, and receiving identification information for the plurality of candidate network entities from the network registration entity. The method further includes initiating, at one or more network entities of the plurality of candidate network entities, training of a model using a machine-learning algorithm as part of a collaborative learning process.

19 Claims, 7 Drawing Sheets

(51) Int. Cl.
  *H04L 41/14* (2022.01)
  *H04L 41/16* (2022.01)
  *H04W 24/02* (2009.01)

(56) References Cited

U.S. PATENT DOCUMENTS

| | | | |
|---|---|---|---|
| 11,109,307 B2* | 8/2021 | Bartolome Rodrigo et al. | ............ H04W 24/02 |
| 11,283,687 B2* | 3/2022 | Wang | ................ H04L 41/0893 |
| 11,537,439 B1 | 12/2022 | Liberty et al. | |
| 11,785,535 B2* | 10/2023 | Wang | ................ H04W 48/10 370/312 |
| 11,832,169 B2* | 11/2023 | Bartolome Rodrigo et al. | ............ H04W 4/50 |
| 2014/0087351 A1 | 3/2014 | Huppenthal | |
| 2014/0222730 A1 | 8/2014 | Vassuer et al. | |
| 2018/0150524 A1 | 5/2018 | Anger et al. | |
| 2018/0307624 A1 | 10/2018 | Zmora et al. | |
| 2019/0205745 A1 | 7/2019 | Sridharan et al. | |
| 2019/0220703 A1* | 7/2019 | Prakash | ................ G06V 10/95 |
| 2019/0238443 A1 | 8/2019 | Di Pietro et al. | |
| 2019/0324805 A1* | 10/2019 | Peng | ................ G06F 9/5005 |
| 2020/0314672 A1* | 10/2020 | Farooq | ................ H04L 43/0817 |
| 2020/0410288 A1 | 12/2020 | Capota et al. | |
| 2021/0014114 A1* | 1/2021 | Doshi | ................ H04L 41/5019 |
| 2021/0168055 A1* | 6/2021 | Lair | ................ H04L 67/52 |
| 2021/0326185 A1* | 10/2021 | Opsenica | ................ G06F 9/5077 |
| 2022/0052925 A1* | 2/2022 | Vandikas | ................ G06F 18/2148 |
| 2022/0159433 A1* | 5/2022 | Flinck | ................ H04W 12/06 |
| 2022/0292398 A1 | 9/2022 | Norrman et al. | |
| 2022/0294706 A1 | 9/2022 | Norrman et al. | |
| 2022/0303886 A1* | 9/2022 | Theimer | ................ H04L 12/1407 |
| 2022/0321423 A1* | 10/2022 | Norrman | ................ H04L 41/0853 |

OTHER PUBLICATIONS

K. Bonawitz et al., "Practical Secure Aggregation for Privacy-Preserving Machine Learning", ACM Conference on Computer and Communications Security, 2017, pp. 1175-1191.
Yoshida et al., "Hybrid-FL for Wireless Networks: Cooperative Learning Mechanism Using Non-IID Data," Proceedings of the IEEE ICC 2019, Dublin, Ireland, Jun. 2020, 7 pages.
Non-Final Office Action for U.S. Appl. No. 17/635,332 mailed May 17, 2023, 20 pages.
International Search Report and Written Opinion of the International Searching Authority, PCT/EP2020/072123, mailed Nov. 9, 2020, 16 pages.
Isaksson, M. et al., "Secure Federated Learning in 5G Mobile Networks", Apr. 14, 2020, Cornell University Library, Ithaca, NY, USA, 7 pages.
China Mobile et al., 3GPP TSG-SA2 Meeting #139E e-meeting, "KI #2, New Sol, Federated Learning among Multiple NWDAF Instances", S2-2004029r03 (revision of S2-200xxxx), Jun. 1-12, 2020, Elbonia, 5 pages.
Niknam, S. et al., "Federated Learning for Wireless Communications: Motivation, Opportunities and Challenges", Jul. 30, 2019, Cornell University Library, Ithaca, NY, USA, 6 pages.
3GPP TS 29.510 v16.0.0, "Network Function Repository Services Stage 3 (Release 15)", Jun. 13, 2019, Valbonne, France, 136 pages.
Nishio, T. et al., "Client Selection for Federated Learning with Heterogeneous Resources in Mobile Edge", Apr. 23, 2018, Cornell University Library, Ithaca, NY, 7 pages.
Bonawitz, K. et al., "Towards Federated Learning at Scale: System Design", Proceedings of the $2^{nd}$ SysML Conference, Mar. 22, 2019, Palo Alto, CA, USA, 15 pages.
McMahan, B.H. et al., "Communication-Efficient Learning of Deep Networks from Decentralized Data", Google, Inc., Feb. 28, 2017, Seattle, WA, USA, 11 pages.
3GPP TR 23.791 v16.1.0, "Study of Enablers for Network Automation for 5G Release 16)", Mar. 2019, Valbonne, France, 124 pages.
3GPP TS 23.288 v0.4.0 "Architecture Enhancements for 5G System (5GS) to Support Network Data Analytics Services (Release 16)", Apr. 2019, Valbonne, France, 48 pages.
3GPP TS 28.550 v16.1.0 "Management and Orchestration; Performance Assurance (Release 16)", Jun. 2019, Valbonne, France, 81 pages.
3GPP TS 23.288 v16.0.0, "Architecture Enhancements for 5G System (5GS) to Support Network Data Analytics Services (Release 16)", Jun. 2019, Valbonne, France, 52 pages.
3GPP TS 23.502 v16.0.2 "Procedure for the 5G System Stage 2, (Release 16)", Apr. 2019, Valbonne, France, 175 pages.
3GPP TS 23.502 v16.1.1 "Procedure for the 5G System Stage 2, (Release 16)", Jun. 2019, Valbonne, France, 495 pages.
Office Action for Chinese Patent Application No. 202080057773.7 dated Nov. 29, 2023, 9 pages.
Notice of Allowance for Chinese Patent Application No. 202080057773.7 dated Dec. 12, 2024, 6 pages.

* cited by examiner

METHODS, APPARATUS AND MACHINE-READABLE MEDIA RELATING TO MACHINE-LEARNING IN A COMMUNICATION NETWORK

CROSS REFERENCE TO RELATED APPLICATIONS

This application is a 35 U.S.C. § 371 national stage application of PCT International Application No. PCT/EP2020/072123 filed on Aug. 6, 2020, which in turns claims domestic priority to U.S. Provisional Patent Application No. 62/887,861, filed on Aug. 16, 2019, the disclosures and content of which are incorporated by reference herein in their entirety.

TECHNICAL FIELD

Embodiments of the disclosure relate to machine-learning, and particularly to methods, apparatus and machine-readable media relating to machine-learning in a communication network.

BACKGROUND

In a typical wireless communication network, wireless devices are connected to a core network via a radio access network. In a fifth generation (5G) wireless communication network, the core network operates according to a Service Based Architecture (SBA), in which services are provided by network functions via defined application interfaces (APIs). Network functions in the core network use a common protocol framework based on Hypertext Transfer Protocol 2 (HTTP/2). As well as providing services, a network function can also invoke services in other network functions through these APIs. Examples of core network functions in the 5G architecture include the Access and mobility Management Function (AMF), Authentication Server Function (AUSF), Session Management Function (SMF), Policy Charging Function (PCF), Unified Data Management (UDM) and Operations, Administration and Management (OAM). For example, an AMF may request subscriber authentication data from an AUSF by calling a function in the API of an AUSF for this purpose.

Efforts are being made to automate 5G networks, with the aim of providing fully automated wireless communication networks with zero touch (i.e. networks that require as little human intervention during operation as possible). One way of achieving this is to use the vast amounts of data collected in wireless communication networks in combination with machine-learning algorithms to develop models for use in providing network services.

A Network Data Analytics (NWDA) framework has been established for defining the mechanisms and associated functions for data collection in 5G networks. Further enhancements to this framework are described in the 3GPP document TS 23.288 v 16.0.0. The NWDA framework is centred on a Network Data Analytics Function (NWDAF) that collects data from other network functions in the network. The NWDAF also provides services to service consumers (e.g. other network functions). The services include, for example, retrieving data or making predictions based on data collated at the NWDAF.

FIG. 1 shows an NWDAF 102 connected to a network function (NF) 104. As illustrated, the network function 104 may be any suitable network function (e.g. an AMF, an AUSF or any other network function). In order to collect data from the network function 104, the NWDAF 102 connects to an Event Exposure Function at the network function over an Nnf reference point (as detailed in the 3GPP documents TS 23.502 v 16.0.2 and TS 23.288 v 16.0.0). The NWDAF 102 can then receive data from the network function over the Nnf reference point by subscribing to reports from the network function or by requesting data from the network function. The timing of any reports may be determined by timeouts (e.g. expiry of a timer) or may be triggered by events (e.g. receipt of a request). The types of data that can be requested by the NWDAF 102 from the network function may be standardised.

For the network function 104 to be discoverable by the NWDAF 102 (or any other service consumer such as, for example, another network function), the network function 104 registers with a Network function Repository Function (NRF).

FIG. 2 shows an illustration of an NRF 208 connected to three network functions, NF A 202, NF B 204 and NF C 206 that are registered at the NRF 208, The NRF 208 may be preconfigured with information about the network functions 202-206, or each of the network functions 202-206 may have performed a network registration procedure with the NRF 208 to register at the NRF 208. Once a network function is registered at the NRF 208, another entity in the network may discover the network function by calling a discovery function at the NRF 208. Thus, for example, NF B 204 may discover NF A 202 and NF C 206 by calling a discovery function at the NRF 208.

As noted above, data collection has the potential to be a powerful tool for 5G networks when coupled with machine-learning. Machine-learning in the context of 5G networks is typically large-scale and may be executed in a cloud (virtualised) environment where performance and security are prioritised. In practice, this means that the data available for training models using machine-learning may be distributed across many entities in the network, and that data should ideally be collated at one network entity to be used for developing models using machine-learning. Collating these datasets at a single network entity can be slow and resource intensive, which is problematic for time-critical applications. In addition, some applications require the use of data sets comprising sensitive or private data, and collating these data at a single network entity may have security implications.

SUMMARY

Embodiments of the present disclosure address these and other problems.

In one aspect, a method performed by a co-ordination network entity in a communications network is provided. The method comprises transmitting a request message, to a network registration entity in the communications network, for identification information for a plurality of candidate network entities in the communications network capable of performing collaborative learning. The method further comprises receiving identification information for a plurality of candidate network entities from the network registration entity; and initiating, at one or more network entities of the plurality of candidate network entities, training of a model using a machine-learning algorithm as part of a collaborative learning process.

In a further aspect, the disclosure provides a co-ordination network entity to perform the method recited above. A further aspect provides a computer program for performing the method recited above. A computer program product, comprising the computer program, is also provided.

In another aspect, a method performed by a network registration entity in a communications network is provided. The method comprises receiving a request message from a co-ordination network entity in the communications network, the request message requesting identification information for a plurality of candidate network entities in the communications network capable of performing collaborative learning. The method further comprises identifying, from a plurality of network entities registered at the network registration entity, two or more candidate network entities capable of performing collaborative learning; and transmitting an indication of the two or more candidate network entities to the co-ordination network entity.

In a further aspect, the disclosure provides a network registration entity to perform the method recited above. A further aspect provides a computer program for performing the method recited above. A computer program product, comprising the computer program, is also provided.

Another aspect provides a co-ordination network entity. The co-ordination network entity comprises processing circuitry and a machine-readable medium storing instructions, which, when executed by the processing circuitry, cause the co-ordination network entity to transmit a request message, to a network registration entity in the communications network, for identification information for a plurality of candidate network entities in the communications network capable of performing collaborative learning. The co-ordination network entity is further caused to receive identification information for a plurality of candidate network entities from the network registration entity and initiate, at one or more network entities of the plurality of candidate network entities, training of a model using a machine-learning algorithm as part of a collaborative learning process.

Another aspect provides a network registration entity. The network registration entity comprises processing circuitry and a machine-readable medium storing instructions, which, when executed by the processing circuitry, cause the network registration entity to receive a request message from a co-ordination network entity in the communications network. The request message requests identification information for a plurality of candidate network entities in the communications network capable of performing collaborative learning. The network registration entity is further caused to identify, from a plurality of network entities registered at the network registration entity 900, one or more candidate network entities capable of performing collaborative learning and transmit an indication of the one or more candidate network entities to the co-ordination network entity.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
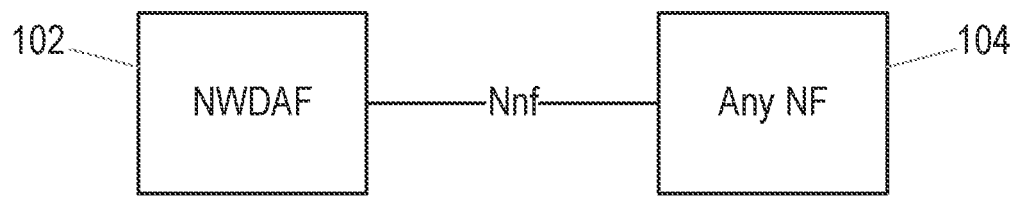
FIG. 1 shows a network data analytics function connected to a network function.
Figure 2:
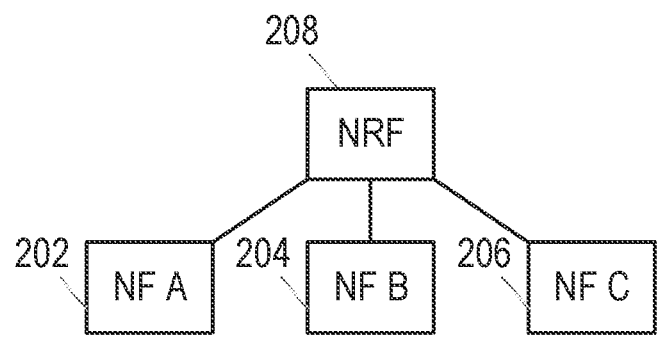
FIG. 2 shows a network function repository function connected to three network functions.
Figure 3:
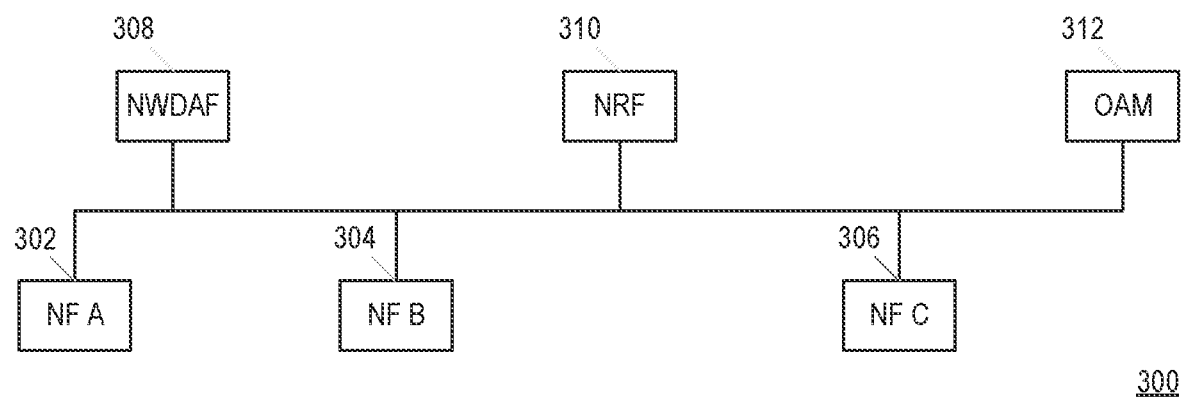
FIG. 3 shows a system according to embodiments of the disclosure.

FIG. 3 shows a system 300 in a communication network according to embodiments of the present disclosure. One or more entities of the system may, for example, form part of a core network in the communication network. The core network may be a Fifth Generation (5G) Core Network (5GCN). The communication network may implement any suitable communications protocol or technology, such as Global System for Mobile communication (GSM), Wideband Code-Division Multiple Access (WCDMA), Long Term Evolution (LTE), New Radio (NR), WiFi, WiMAX, or Bluetooth wireless technologies. In one particular example, the network forms part of a cellular telecommunications network, such as the type developed by the $3^{rd}$ Generation Partnership Project (3GPP). Those skilled in the art will appreciate that the system 300 may comprise further components that are omitted from FIG. 3 for the purposes of clarity.

The system 300 comprises at least two network entities or network functions (NFs). In the illustrated embodiment, three network entities, NF A 302, NF B 304 and NF C 306, are shown, although the skilled person will appreciate that the system 300 may comprise many more network entities than shown. The network entities 302-306 are configured to provide one or more services. The network entities may be any type or combination of types of network entities or network functions. For example, one or more of the network entities 302-306 may comprise core network entities or functions such as an access and mobility management function (AMF), an authentication server function (AUSF), a session management function (SMF), a policy control function (PCF), and/or a unified data management (UDM) function. Alternatively or additionally, one or more of the network entities 302-306 may be implemented within entities outside the core network, such as radio access network nodes (e.g., base stations such as gNBs, eNBs etc or parts thereof, such as central units or distributed units). The network entities 302-306 may be implemented in hardware, software, or a combination of hardware and software.

Each of the network entities 302-306 is registered at a network registration entity 310 that also forms part of the system 300. In this example, the network registration entity is a Network function Repository Function (NRF) 310. However, the skilled person will appreciate that the network registration entity may be any suitable network entity that provides registration and discovery for network entity services. The NRF 310 may thus store information for each of the network entities 302-306 registered there. The stored information may include one or more of: a type of each of the network entities 302-306; a network address (e.g., IP address) of the network entities; services provided by the network entities; and capabilities of the network entities. Thus, once registered at the NRF 310, the network entities 302-306 are discoverable by other entities in the network.

The system 300 further comprises a Network Data and Analytics Function (NWDAF) 308. The NWDAF 308 is configured to collect network data from one or more network entities, and to provide network data analytics information to network entities which request or subscribe to receive it. For example, an NWDAF may provide information relating to network traffic or usage (e.g. predicted load information or statistics relating to historical load information). The network data analytics information provided by the NWDAF may, for example, be specific to the whole network, or to part of the network such as a network entity or a network slice. In this context, a network slice may be a logical partition (e.g. a virtual network) in the communications network. The network slice may be dedicated to a particular use-case or end-user. For example, the network slice may comprise one or more network functions for a particular use-case or end-user. In particular examples, a network slice may be defined in hardware. For example, the network slice may comprise a set of servers dedicated for a particular use-case or end-user. The network slice may be isolated from or independent of other parts of the communication network. For example, the transfer of information between a network slice and other parts of the communication network (e.g. other network slices) may be prohibited or restricted.

The network data analytics information provided by the NWDAF 308 may comprise forecasting data (e.g. an indication of a predicted load for a network function) and/or historical data (e.g. an average number of wireless devices in a cell in the communication network). The network data analytics information provided by the NWDAF may include, for example, performance information (e.g. a ratio of successful handovers to failed handovers, ratio of successful setups of Protocol Data Unit (PDU) Sessions to failed setups, a number of wireless devices in an area, an indication of resource usage etc.).

As described above, communication networks are becoming increasingly automated, with network designers seeking to minimise the level of human intervention required during operation. One way of achieving this is to use the data collected in communication networks to train models using machine-learning, and to use those models in the control of the communication network. As communication networks continue to obtain data during operation, the models can be updated and adapted to suit the needs of the network. However, as noted above, conventional methods for implementing machine-learning in communication networks require collating data for training models at one network entity. Collating these data at a single network entity, such as the NWDAF 308, can be slow and resource intensive and may be problematic if the data is sensitive in nature.

Aspects of the disclosure address these and other problems.

In one aspect, a collaborative (e.g. federated) learning process is used to train a model using machine-learning. Rather than collating training data for training the model at a single network entity, instances of the model are trained locally at multiple network functions to obtain local updates to parameters of the model at each network entity. The local model updates are collated at an aggregator network entity (such as the NWDAF) and combined to obtain a combined model update. In this way, data from across multiple entities in a communication network are used to train a model using machine-learning, whilst minimising resource overhead and reducing security risks.

Accordingly, in the system 300 illustrated in FIG. 3, the NWDAF 308 initiates training of a model using machine-learning at each of the network functions, NF A 302, NF B 304 and NF C 306. For example, the NWDAF 308 may transmit a message to each of the network functions 302-306 instructing the network function to train a model using machine-learning. The message may comprise a copy of the model (e.g. a global copy that is common to each of the network functions 302-306), or each of the network functions 302-306 may be preconfigured with a copy of the model. In the latter case, the message may comprise an indicator of which model is to be trained. The message may specify a type of machine-learning algorithm to be used by the network entities. Alternatively, the network entities 302-306 may be preconfigured with the type of machine-learning algorithm to be used for a model.

On receipt of the message from the NWDAF 308, each network entity 302-306 trains the model by inputting training data into the machine-learning algorithm to obtain a local model update to values of one or more parameters of the model. The training data may be data that is unique to the network entity. For example, the training data may comprise data obtained from measurements performed by the network function and/or data collected by the network function from other network entities (e.g. data obtained from measurements performed by one or more other network entities).

Each of the network entities 302-306 transmits the local model update to the NWDAF 308. The local model update may comprise updated values of the parameters of the model or the local model update may comprise an indication of a change in the values of the parameters of the model, e.g., differences between previous values for the parameters and updated values for the parameters.

Transmissions between the network entities 302-306 and the NWDAF 308 may be direct (e.g. the NWDAF 308 transmits directly to a network entity) or the transmissions may be via an intermediate network entity. For example, the transmission between the network functions 302-306 and the NWDAF 308 may be via an Operation, Administration and Management function (OAM) 312.

The NWDAF 308 thus receives the local model updates from each of the network entities 302-306. The NWDAF 308 combines the model updates received from the network entities 302-306 to obtain a combined model update. The NWDAF 308 may use any suitable operation for combining the model updates. For example, the NWDAF 308 may average the received local model updates to obtain an average model update. In a further example, the average may be a weighted average, with updates from different network entities being assigned different weights.

The NWDAF 308 transmits the combined model update to one or more network entities in the network. For example, the NWDAF 308 may send the combined model update to each of the network entities 302-306. In particular examples, the combined model update may be transmitted to one or more further network entities in addition to the network entities 302-306 used to train the model.

This process may be repeated one or more times. For example, the process may be repeated until the local model updates received from each of the network entities 302-306 are consistent with each other to within a predetermined degree of tolerance. In another example, the process may be repeated until the combined model updates converge, i.e. a combined model update is consistent with a previous combined model update to within a predetermined degree of tolerance.

Collaborative (e.g. federated) learning may thus be applied to communication networks (and in particular, to a core network in a communication network) to reduce latency, minimise resource overhead and reduce the risk of security problems.

As noted above, as part of this application of collaborative learning to a communication network, a network entity initiates training of a machine-learning model at a plurality of other network entities in the communication network. However, communication networks often comprise large numbers of network entities and only a fraction of these network entities may be configured to support collaborative learning. In addition, participation in training of a particular model with a particular machine-learning algorithm may be associated with specific hardware or software requirements that only a subset of network entities satisfy.

Embodiments of the disclosure provide methods, apparatus and machine-readable media for selecting network entities for performing collaborative learning. In particular, a co-ordination network entity in a communications network transmits a request message to a network registration entity in the communications network, for identification information for a plurality of candidate network entities in the communications network capable of performing collaborative learning. The co-ordination entity then receives identification information for a plurality of candidate network entities from the network registration entity and initiates, at one or more network entities of the plurality of candidate network entities, training of a model using a machine-learning algorithm as part of a collaborative learning process.

The embodiments described herein thus provide an efficient method for selecting network entities to perform a collaborative learning process. In particular, by identifying candidate network entities that are capable of performing collaborative learning, the embodiments described herein prevent network entities that are not capable of performing collaborative learning from being selected to perform the collaborative learning process, thereby minimising the risk of errors when model updates obtained during the collaborative learning process are aggregated and combined. Embodiments of the disclosure thus provide a more reliable method of selecting network entities for the performance of collaborative learning in a communications network.

Figure 4:
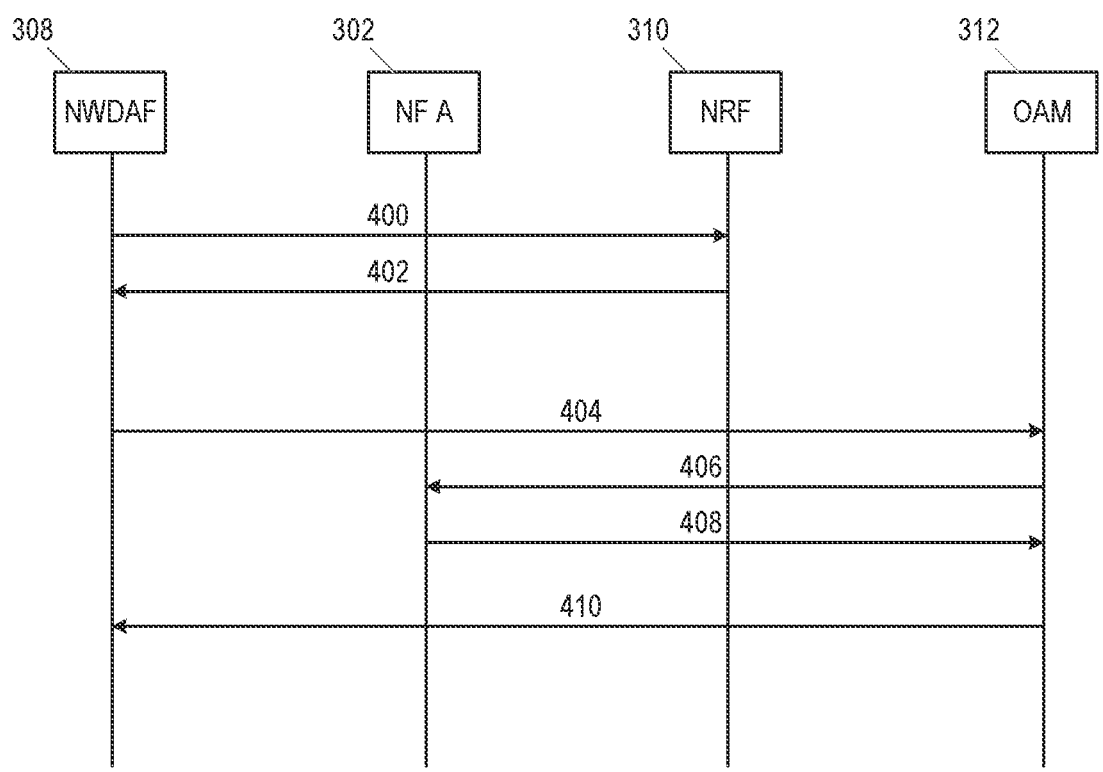
FIG. 4 is a schematic signaling diagram according to embodiments of the disclosure.

FIG. 4 is a schematic signaling diagram according to embodiments of the disclosure. The signaling involves a co-ordination network entity, a network registration entity, and a network entity or function. The co-ordination network entity may comprise an NWDAF, such as the NWDAF 308 described above with respect to FIG. 3. The network registration entity may comprise an NRF, such as the NRF 310 described above with respect to FIG. 3. In the illustrated embodiment, the signaling also involves an OAM, such as the OAM 312 described above with respect to FIG. 3. However, other embodiments may not involve the OAM. The signaling shown in FIG. 4 permits the co-ordination network entity (hereinafter, the NWDAF 308) to select one or more network entities to participate in a collaborative learning process such as federated learning. Thus the signaling in FIG. 4 may be performed upon the NWDAF 308 deciding to develop, or further train, a model.

Prior to the signaling shown in FIG. 4, one or more network entities (including NF A 302 shown in the illustration) register with the NRF 310. In registering with the NRF 310, a network entity provides information relating to the services provided by the network entity (such as the type of network entity or the function performed thereby), and/or the capability of the network entity. Such information may be stored by the NRF 310, and associated with an identifier (e.g., a unique number within the network) allowing the network entity to be identified and addressed. Further information regarding the stored information and the identifier is set out below.

The procedure begins with the NWDAF 308 transmitting, to the NRF 310, a first request message 400 for identification information for a plurality of candidate network entities in the communications network capable of performing collaborative learning. The first request message 400 may be sent directly from the NWDAF 308 to the NRF 310 (as illustrated) or indirectly via one or more intermediate entities in the communication network. The first request message 400 thus comprises a request that the NRF 310 provide a list of network entities which are capable of performing collaborative learning (such as federated learning).

The first request message 400 may comprise one or more first selection criteria for selecting candidate network entities for performing a collaborative learning process. The one or more first selection criteria may comprise at least one primary criterion relating to a capability of the candidate network entity to perform the collaborative learning process.

The at least one primary criterion may specify one or more particular types of network entity. For example, the first request message 400 may indicate that each of the candidate network entities must be an Access and Mobility management Function (AMF), or a dedicated machine-learning network function. The at least one primary criterion may, additionally or alternatively, specify a service available at or provided by each of the candidate network entities. That is, the first request message 400 may specify that each network entity selected as a candidate network entity is capable of providing a particular service. For example, the first request message 400 may specify that each network entity selected as a candidate network entity is capable of providing subscriber authentication data, or a particular type of collaborative learning.

The at least one primary criterion may relate to hardware and/or software requirements for the candidate network entities. For example, the at least one primary criterion may specify that each candidate network entity must have a graphical processing unit (GPU) or other suitable hardware available for training a model using machine-learning.

Additionally or alternatively, the one or more first selection criteria in the first request message 400 may comprise at least one secondary criterion relating to a capability of the candidate network entity to support a type of query. That is, the at least one secondary criterion relates to whether or not the candidate network entity is configured to respond to a particular type of query. Examples of different types of queries are discussed in more detail below, but may include, for example, queries from particular types of network entities (such as the NWDAF 308 or the OAM 312), and/or queries for particular types of information.

The NRF 310 identifies, from a plurality of network entities registered at the network registration entity, two or more candidate network entities capable of performing collaborative learning. The two or more candidate network entities may be, for example, in a core network of the communications network. Alternatively, at least one of the two or more candidate network entities may be, for example, in another part of the communications network (e.g. a radio access network, a backhaul network etc.).

The NRF 310 may store a profile for each network entity that is registered with it. Each profile may comprise information relating to the services provided by the network entity (such as the type of network entity or the function performed thereby), and/or the capability of the network entity. Such information may be stored by the NRF 310, and associated with an identifier (e.g., a unique number within the network) or some other means allowing the network entity to be identified and addressed. The profile may comprise an indication of one or more services that the network entity is capable of providing. For example, a profile may indicate the type of the network entity, e.g., that the network entity is a PCF, an ASF, or a dedicated machine-learning network function or entity.

The capability information may comprise an indication of whether or not the network entity is capable of performing collaborative (e.g. federated) learning. Thus, the NRF 310 may use the profiles for the plurality of network entities registered at the network registration entity to identify network entities that are capable of performing collaborative learning.

The capability information included in the profiles of network entities registered at the NRF 310 may further comprise an indication of whether or not the network entity is configured to respond to a type of query. For example, the profile for a network entity may specify that the network entity is capable of responding to queries using a protocol and/or format used by a particular type of network entity, e.g., from the NWDAF 308, or the OAM 312. Additionally or alternatively, the profile for a network entity may specify that the network entity is capable of responding to queries relating to the storage available at the network entity.

As described above, the first request message 400 may comprise one or more first selection criteria for selecting a candidate network entity from the two or more network entities for training a model using machine-learning as part of a collaborative learning process. Thus, the NRF 310 may, as part of identifying the two or more candidate network entities that are capable of performing collaborative learning, identify two or more candidate network entities that satisfy the one or more first selection criteria by searching the profiles of the network entities registered with it.

The NRF 310 transmits, in a first response message 402, an indication of the two or more candidate network entities to the NWDAF 308. For example, the indication may comprise identification information for each of the two or more candidate network entities. The first response message 402 may further include addressing information for the two or more candidate network entities (e.g. information enabling the two or more candidate network entities to be addressed in the communication network). The identification information may correspond to the addressing information. For example, the identifier stored in the profile may correspond to the identification information and/or addressing information for the network entities.

In some embodiments, after receiving the indication of the two or more candidate network entities from the NRF 310, the NWDAF 308 initiates, at the two or more candidate network entities, training of a model using a machine-learning algorithm as part of a collaborative learning process. For example, the NWDAF 308 may send a trigger message to each of the candidate network entities instructing the candidate network entity to train the model using the machine-learning algorithm. The trigger message may, for example, include information relating to the model (e.g. model parameters and/or identifying information for the model) and/or an indication of the machine-learning algorithm to be used. Alternatively, the candidate network entities may be preconfigured with some or all of this information.

In other embodiments, however, the NWDAF 308 transmits a second request message 404 comprising at least one query for additional information for each candidate network entity in the two or more candidate network entities. The at least one query may comprise one or more second selection criteria for selecting candidate network entities.

In embodiments in which the first request message 400 comprises at least one secondary criterion relating to a capability of a candidate network entity to support a type of query, the second request message 404 may comprise a query of the type specified in the first request message 400. Thus, for example, if the first request message 400 comprises a criterion specifying that candidate network entities must be capable of responding to queries relating to hardware at the candidate network entity, then the second request message 400 may specify that the candidate network entity has a particular type of hardware (e.g. a graphical processing unit).

Those skilled in the art will appreciate that the at least one query may take any suitable form. For example, the at least one query may comprise Event Filter Information as described, for example, in TS 23.502 v 16.1.1. Other suitable formats for a query may be found, for example, in TS 28.550 v 16.1.0, although the skilled person will appreciate that the disclosure is not limited as such.

The at least one query may relate to a configuration of the candidate network entity, e.g., what hardware and/or software is present at or utilized by the candidate network entity. For example, the at least one query may request information relating to a number of graphical processing units (GPUs) at the candidate network entity. In another example, the at least one query may comprise one or more second selection criteria specifying a minimum number of graphical processing units (GPUs) at the candidate network entity. In another example, the at least one query may comprise one or more selection criteria specifying a particular software version to be supported by the candidate network entity. Examples of queries relating to the configuration of a candidate network entity include queries relating to one or more of the following: software versions, licences, neighbour relations, one or more configuration parameters, and a type and/or quantity of hardware and/or software at the candidate network entity.

In particular embodiments, the at least one query relating to the configuration of a candidate network entity may relate to computational resources available at the candidate network entity. In this context, computational resources may include, for example, memory (e.g. random-access memory or storage) available at the network entity, processing power at the network entity, and/or any other suitable computational resources. For example, the at least one query may comprise a second selection criterion specifying that a candidate network entity has a minimum amount of memory available. In another example, the at least one query may comprise a second selection criterion specifying that a candidate network entity has a minimum amount of processing power available.

The at least one query for a candidate network entity may, additionally or alternatively, relate to a performance requirement for the candidate network entity. Queries relating to a performance requirement may include, for example, queries relating to a performance measurement (PM) procedure, a key performance indicator (KPI) and/or any other suitable performance metric for the candidate network entity. The one or more second selection criteria may thus relate to threshold values for a particular performance measurement, key performance indicator and/or other performance metric.

The performance requirement may relate to a historical or predicted performance of the candidate network entity. The performance requirement may relate to, for example, usage of a service provided by the candidate network entity (e.g. a number of users of a service, a number of times a service has been used), traffic flow for the network entity and/or resources used by the candidate network entity (e.g. memory, processing power and/or network resources). The performance requirement may be specific to a particular time period. For example, the performance requirement may specify a minimum number of predicted users for the next hour. In another example, the performance requirement may specify a threshold number of average users during the time period 12:00-12:15 in the last week.

The at least one query for a candidate network entity may relate to an availability of training data at the candidate network entity. In order to train a model using a machine-learning algorithm, a network entity inputs data (training data) into a machine-learning algorithm. Training data for a candidate network entity may, for example, comprise data obtained from measurements performed by the candidate network entity and/or data collected by the candidate network entity from other network entities (e.g. data obtained from measurements performed by one or more other network entities). A candidate network entity that supports queries relating to an availability of training data may be configured to, in response to receiving a query of this type, indicate whether suitable training data is available at the candidate network entity. For example, a query may relate to a quantity, age (i.e. an indication of when the data was measured or obtained), quantity or content of training data at the candidate network entity. Thus, for example, a candidate network entity may receive a query for information regarding the quantity of training data at the candidate network entity, and the candidate network entity may respond with an indication of a number of data samples available at the candidate network entity.

The at least one query for a candidate network entity may relate to the performance of the candidate network entity in training a model using machine-learning. Thus, a candidate network entity may be configured to, in response to receiving a query of this type, obtain one or more metrics indicative of a performance of a preliminary model developed using the machine-learning algorithm. That is, the candidate network entity may be configured to use a validation or test data set to test the performance of a model developed at that candidate network entity. The validation or test data set may be a subset of training data available at the candidate network entity. Alternatively, the validation or test data set may be provided (e.g. by the NWDAF 308) to the candidate network entity. The metrics may comprise an indicator of the accuracy and/or precision of the model. The metrics may, additionally or alternatively, be indicative of the efficiency of training the model at the candidate network entity. For example, the metrics may comprise an indicator of the resources used at the candidate network entity to train the preliminary model (memory, processing power etc.) and/or the time taken (e.g. processor time, wall clock time etc.) to train the preliminary model.

The NWDAF 308 transmits the second request message 404 comprising the at least one query for additional information to the OAM 312. The NWDAF 308 may thus transmit a single second request message 404 to the OAM 312 for all of the candidate network entities. Alternatively, the NWDAF 308 may transmit two or more second request messages to the OAM 312 (e.g. one second request message per candidate network entity).

The OAM 312 receives the second request message 404 comprising the at least one query from the NWDAF 308. In some embodiments, the OAM 312 stores the required information to answer the at least one query for each of the candidate network devices (e.g. in a cache). For example, the OAM 312 may store network traffic load information for each of the candidate network devices. Thus, if the at least one query specifies that the candidate devices must have a network traffic load that is less than 50%, then the OAM 312 may determine which candidate network devices satisfy this requirement and send an indication of which candidate network devices satisfy this requirement to the NWDAF 308.

Alternatively, if the OAM 312 does not store the information required to respond to the at least one query for all of the candidate network devices, the OAM 312 may generate a third request message 406 based on the at least one query and transmit the third request message 406 to at least one of the two or more candidate network entities. The third request message 406 may comprise the at least one query, or the third request message 406 may be based at least in part on the second request message 404. The OAM 312 may, for example, store the information required to respond to part of the at least one query, but lack information required to respond to the rest of the query. For example, the at least one query may relate to an average network traffic load of the candidate network entities and an average number of users, and the OAM 312 may store the average network traffic load of the candidate network entities, but not the average number of users. Thus, the third request message 406 may comprise a request for the remaining information required to answer the query. In alternative embodiments, the OAM 312 forwards the second request message 404 to each of the candidate network entities as a third request message 406.

Each of the candidate network entities receiving the third request message 406 from the OAM 312 may send, to the OAM 312, a second response message 408 comprising the additional information requested in the at least one query. For example, the third request message 406 may comprise a query relating to a version of a type of software supported by the candidate network entity. The candidate network entity may thus indicate, in the response message 408, the software version(s) that it is configured to use.

In embodiments in which the at least one query comprises one or more second selection criteria, each of the candidate network entities that receives the third request message 406 may indicate, in a second response message 408, whether or not it complies with the one or more second selection criteria comprised in the at least one query. The candidate network entities may, for example, use one or more Boolean parameters to indicate which of the one or more second selection criteria are satisfied (e.g. the second response message 408 may comprise one Boolean parameter per second selection criterion). In one example, a candidate network entity satisfying all of the one or more second selection criteria returns a True value (e.g., a logical value of 1). In another example, a candidate network entity that does not satisfy at least one of the one or more second selection criteria returns a False value (e.g., a logical value of 0). For example, the at least one query may comprise the second selection criterion that the candidate network entity has collected at least 1000 data samples (e.g. for use in training the model). A candidate network entity that has collected only 800 data samples thus returns a False value in the second response message 408.

In particular embodiments, if the at least one query comprises one or more second selection criteria, a candidate network entity may only respond to the third request message 406 if the candidate network entity satisfies each of the one or more second selection criteria. Thus, in the aforementioned example, candidate network entities that have collected fewer than 1000 data samples may not respond to the third request message 406. The OAM 312 may thus consider a lack of a response from a candidate network entity to be an indication that the candidate network entity does not satisfy the one or more second selection criteria.

The OAM 312 thus receives a second response message 408 from one or more of the candidate network entities. The OAM 312 sends a third response message 410 to the NWDAF 308 based on the second response message 408. For example, the OAM 312 may forward the second response message 408 to the NWDAF 308 in the third response message 410. Alternatively, the OAM 312 may extract the additional information requested in the at least one query from the second response message 408 and send the additional information to the NWDAF 308 in the third response message 410.

If the at least one query comprises one or more second selection criteria, then the OAM 312 may transmit a third response message 410 to the NWDAF 308, in which the third response message 410 comprises an indication of which of the two or more candidate network entities satisfy the one or more second selection criteria. Thus, for example, the third response message 410 may comprise identification information for only the candidate network entities that satisfy the one or more second selection criteria. Alternatively, the third response message may include identification information for all of the candidate network entities initially identified to the OAM 312 (in the request message 404) along with an indication (e.g. a Boolean) as to whether each candidate network entity satisfies the one or more second selection criteria.

In particular embodiments, the OAM 312 may send an indication for only a subset of the candidate network entities meeting the one or more second selection criteria. For example, the OAM 312 may be preconfigured with a maximum number of candidate network entities to report to the NWDAF 308. Alternatively, the NWDAF 308 may indicate in the second request message 404, a maximum number of candidate network entities to report.

Thus only a subset of those network entities meeting the second selection criteria may be reported to the NWDAF 308. The OAM 312 may use any suitable method for selecting the subset of candidate network entities. The subset of candidate network entities may, for example, be chosen at random. Alternatively, the OAM 312 may select a subset of the candidate network entities based on a characteristic of the candidate network entities. Information relating to the characteristic of the candidate network entities may be stored (e.g. in a cache) at the OAM 312 or the OAM may, for example, obtain the information from the candidate network entities (e.g. in the second response messages 408).

The OAM 312 may rank the candidate network entities according to the particular characteristic and select the best (e.g. highest) ranking candidate network entities. A secure multi-party computation algorithm (e.g. a Yao's Millionaires' Problem algorithm) may be used to compare the characteristics of multiple candidate network entities whilst minimising the information shared between network entities. For example, the OAM 312 may select the subset of candidate network entities that have the largest training datasets. Thus, a secure multi-party computation algorithm may be used to determine which candidate network entities have the largest training datasets without revealing, to the OAM 312, the size of the training datasets.

In other examples, the OAM 312 may select the subset of candidate network entities based on their location in the network. For example, the OAM 312 may preferentially select candidate network entities that are in the same network slice.

Thus, in particular embodiments, the OAM 312 selects a subset of the candidate network entities based on the one or more second response messages 408 received from the candidate network entities. The OAM 312 then transmits the third response message 410 to the NWDAF. Using the third response message 410, the NWDAF 308 selects one or more of the candidate network entities to participate in the collaborative learning process to train a model using a machine-learning algorithm.

In some embodiments, the third response message 410 comprises the additional information requested in the at least one query. The NWDAF 308 may thus select the one or more candidate network entities based on the additional information. For example, if the additional information comprises an indication of the number of data samples available at each of the candidate network entities for training a model using machine-learning, the NWDAF 308 may select the one or more candidate network entities with the largest number of data samples. In another example, the NWDAF 308 may apply one or more second selection criteria (such as the one or more second selection criteria described above) to select the one or more candidate network entities. In this example, the NWDAF 308, rather than the candidate network entities, determines whether the candidate network entities satisfy the one or more second selection criteria.

The third response message 410 may comprise an indication of which of the two or more candidate network entities satisfy the one or more second selection criteria. The NWDAF 410 may thus, for example, select the candidate network entities indicated as satisfying the one or more second selection criteria to participate in the collaborative learning process.

In particular embodiments, the NWDAF 308 receives, for at least one candidate network entity of the two or more candidate network entities, one or more participation criteria for participating in the collaborative learning process. The one or more participation criteria may be included in the third response message 410, and may have been specified by the at least one candidate network entity (e.g. in the second response message 408).

The one or more participation criteria may include any suitable criteria including, for example, a requirement that a minimum threshold number of network entities participate in the collaborative learning process, a requirement that the NWDAF 308 is in a same network slice as the candidate network entity and/or a requirement that all of the network entities participating in the collaborative learning process are in a same network slice.

The NWDAF 308 may select one or more of the candidate network entities to participate in the collaborative learning process based on the one or more participation criteria. Thus, for example, if a participation criterion specified by a candidate network device is not satisfied, then the NWDAF 308 may not select that candidate network device. Conversely, the NWDAF 308 may select a candidate network device to participate in the collaborative learning process if the one or more participation criteria specified by the candidate network device are satisfied.

The NWDAF 308 may use any of the aforementioned approaches for selecting candidate network entities. The NWDAF 308 may then initiate training, at the selected candidate network entities, training of a model using a machine-learning algorithm as part of a collaborative learning process. The NWDAF 308 may send a trigger message to each of the selected candidate network entities instructing the candidate network entity to train the model using the machine-learning algorithm. The trigger message may, for example, include information relating to the model (e.g. model parameters and/or identifying information for the model) and/or an indication of the machine-learning algorithm to be used. Alternatively, the candidate network entities may be preconfigured with some or all of this information.

In the embodiment described in relation to FIG. 4, the NWDAF queries the candidate network entities by sending a query to an intermediate network entity (in this case, the OAM 312). However, those skilled in the art will appreciate that, in some embodiments, the NWDAF 308 may query the candidate network entities directly by transmitting a second request message 404 to each candidate network entity and receiving one or more responses from one or more of the candidate network entities. In such embodiments, the selection of a subset of candidate network entities at the OAM 312 may be omitted.

Figure 5:
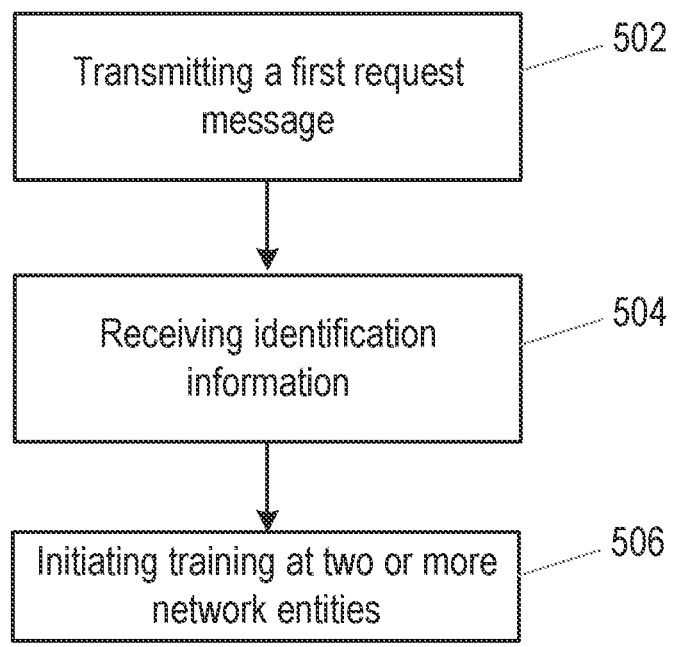
FIG. 5 is a flowchart of a method according to embodiments of the disclosure.

FIG. 5 is a flowchart of a method performed by a co-ordination network entity in a communication network according to embodiments of the disclosure. The co-ordination entity may be, for example, the NWDAF 302 described above in relation to FIG. 3. The co-ordination entity may be in a core network of the communications network. Alternatively, the co-ordination network may be, for example, in a radio access network or a backhaul network of a communications network.

The method begins in step 502, in which the co-ordination network entity transmits a request message, to a network registration entity in the communications network, for identification information for a plurality of candidate network entities in the communications network capable of performing collaborative learning. The network registration entity may be, for example, in a core network of the communications network. The network registration entity may be, for example, the Network function Repository Function (NRF) described above in relation to FIG. 3. Step 502 may correspond substantially to transmission of the first request message 400 described above with respect to FIG. 4, for example.

In step 504, the co-ordination network entity receives identification information for a plurality of candidate network entities from the network registration entity. Step 504 may correspond substantially to receipt of the first response message 402 described above with respect to FIG. 4, for example.

In step 506, the co-ordination network entity initiates, at one or more network entities of the plurality of candidate network entities, training of a model using a machine-learning algorithm as part of a collaborative learning process.

Figure 6:
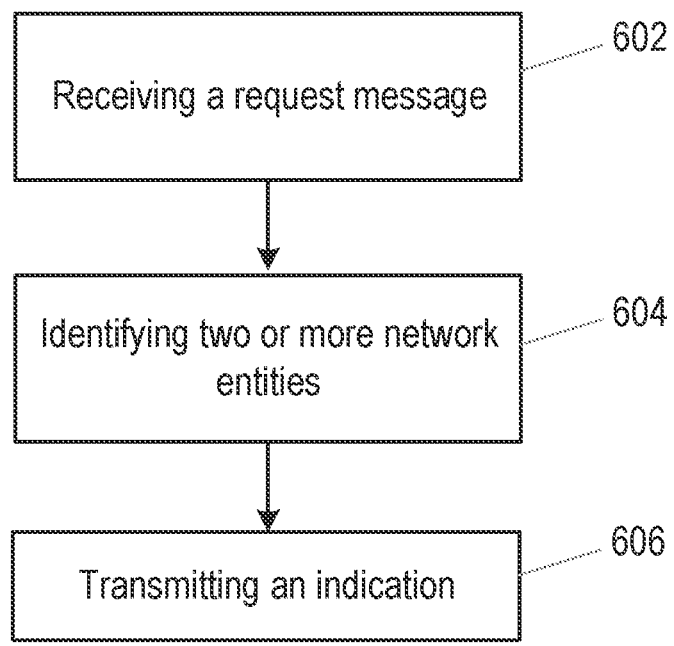
FIG. 6 is a flowchart of a method according to embodiments of the disclosure.

FIG. 6 is a flowchart of a method performed by a network registration entity in a communication network according to embodiments of the disclosure. The network registration may be, for example, in a core network of the communications network. The network registration entity may be, for example, the Network function Repository Function (NRF) described above in relation to FIG. 3.

The method begins in step 602, in which the network registration entity receives a request message from a co-ordination network entity in the communications network, in which the request message requests identification information for a plurality of candidate network entities in the communications network capable of performing collaborative learning. The co-ordination entity may be, for example, the NWDAF 302 described above in relation to FIG. 3. The co-ordination entity may be in a core network of the communications network. Step 602 may correspond substantially to receipt of the first request message 400 described above with respect to FIG. 4, for example.

In step 604, the network registration entity identifies, from a plurality of network entities registered at the network registration entity, two or more candidate network entities capable of performing collaborative learning.

In step 606, the network registration entity transmits an indication of the two or more candidate network entities to the co-ordination network entity. Step 606 may correspond substantially to transmission of the first response message 402 described above with respect to FIG. 4, for example.

Figure 7:
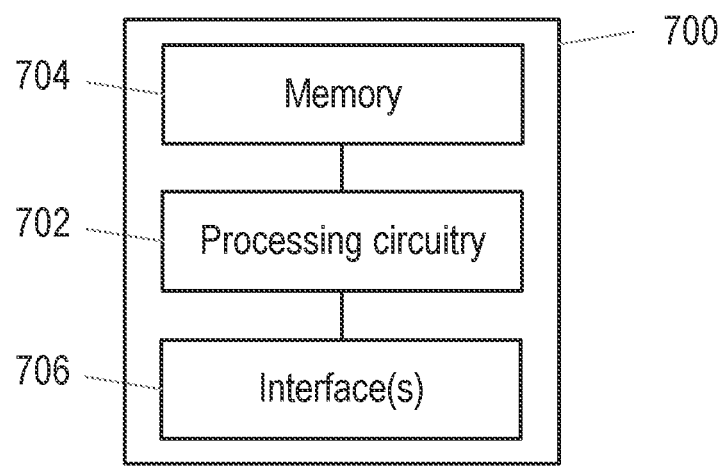
FIGS. 7 and 8 are schematic diagrams of a co-ordination network entity according to embodiments of the disclosure.

FIG. 7 is a schematic diagram of an apparatus 700 for a communication network (for example, the system 300 shown in FIG. 3) according to embodiments of the disclosure. The apparatus 700 may be implemented in a network function or entity (such as, for example, the NWDAF 308 described above in respect of FIG. 3). Apparatus 700 is operable to carry out the example method described with reference to FIG. 5 and possibly any other processes or methods disclosed herein. It is also to be understood that the method of FIG. 5 may not necessarily be carried out solely by apparatus 700. At least some operations of the method can be performed by one or more other entities.

The apparatus 700 comprises processing circuitry 702 (such as one or more processors, digital signal processors, general purpose processing units, etc), a machine-readable medium 704 (e.g., memory such as read-only memory (ROM), random-access memory, cache memory, flash memory devices, optical storage devices, etc) and one or more interfaces 706.

According to embodiments of the disclosure, the machine-readable medium 704 stores instructions which, when executed by the processing circuitry 702, cause the apparatus 700 to: transmit a request message, to a network registration entity in the communications network, for identification information for a plurality of candidate network entities in the communications network capable of performing collaborative learning; receive identification information for a plurality of candidate network entities from the network registration entity; and initiate, at one or more network entities of the plurality of candidate network entities, training of a model using a machine-learning algorithm as part of a collaborative learning process.

In other embodiments, the processing circuitry 702 may be configured to directly perform the method, or to cause the apparatus 700 to perform the method, without executing instructions stored in the non-transitory machine-readable medium 704, e.g., through suitably configured dedicated circuitry.

The one or more interfaces 706 may comprise hardware and/or software suitable for communicating with other nodes of the communication network using any suitable communication medium. For example, the interfaces 106 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 106 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the apparatus 700 may comprise power circuitry (not illustrated). The power circuitry may comprise, or be coupled to, power management circuitry and is configured to supply the components of apparatus 700 with power for performing the functionality described herein. Power circuitry may receive power from a power source. The power source and/or power circuitry may be configured to provide power to the various components of apparatus 700 in a form suitable for the respective components (e.g., at a voltage and current level needed for each respective component). The power source may either be included in, or external to, the power circuitry and/or the apparatus 700. For example, the apparatus 700 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 8:
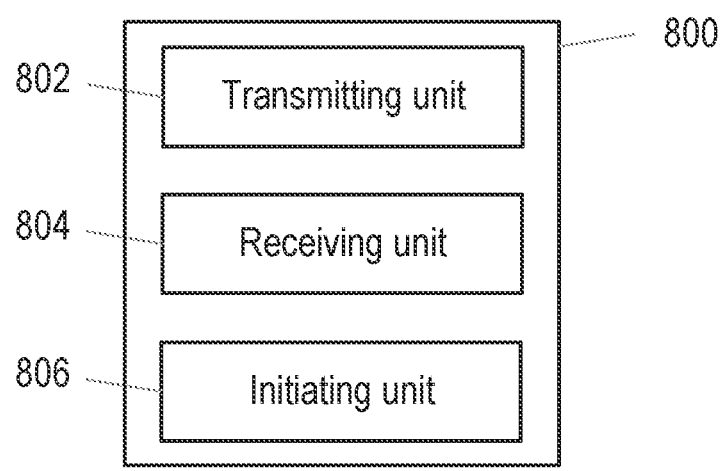

FIG. 8 is a schematic diagram of an apparatus 800 for a communication network (for example, the system 300 shown in FIG. 3) according to embodiments of the disclosure. The apparatus 800 may be implemented in a network entity or function (such as, for example, the NWDAF 308 describe above with respect to FIG. 3). Apparatus 800 is operable to carry out the example method described with reference to FIG. 5 and possibly any other processes or methods disclosed herein. It is also to be understood that the method of FIG. 5 may not necessarily be carried out solely by apparatus 800. At least some operations of the method can be performed by one or more other entities.

The apparatus 800 comprises a transmitting unit 802, which is configured to transmit a request message, to a network registration entity in the communications network, for identification information for a plurality of candidate network entities in the communications network capable of performing collaborative learning. The apparatus 800 further comprises a receiving unit 804 and an initiating unit 806. The receiving unit 804 is configured to receive identification information for a plurality of candidate network entities from the network registration entity. The initiating unit 806 is configured to initiate, at one or more network entities of the plurality of candidate network entities, training of a model using a machine-learning algorithm as part of a collaborative learning process.

Apparatus 800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 802, receiving unit 804, initiating unit 806, and any other suitable units of apparatus 800 to perform corresponding functions according one or more embodiments of the present disclosure.

Apparatus 800 may additionally comprise power-supply circuitry (not illustrated) configured to supply the apparatus 800 with power.

Figure 9:
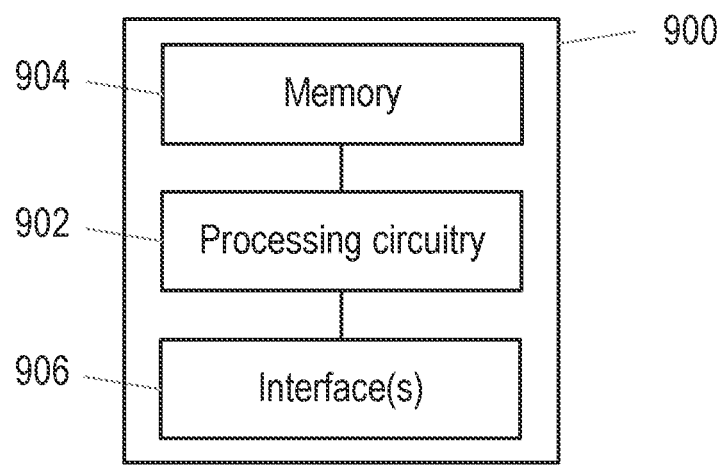
FIGS. 9 and 10 are schematic diagrams of a network registration entity according to embodiments of the disclosure.

FIG. 9 is a schematic diagram of an apparatus 900 for a communication network (for example, the system 300 shown in FIG. 3) according to embodiments of the disclosure. The apparatus 900 may be implemented in a network function or entity (for example, the NRF 310 shown in FIG. 3). Apparatus 900 is operable to carry out the example method described with reference to FIG. 6 and possibly any other processes or methods disclosed herein. It is also to be understood that the method of FIG. 6 may not necessarily be carried out solely by apparatus 900. At least some operations of the method can be performed by one or more other entities.

The apparatus 900 comprises processing circuitry 902 (such as one or more processors, digital signal processors, general purpose processing units, etc), a machine-readable medium 904 (e.g., memory such as read-only memory (ROM), random-access memory, cache memory, flash memory devices, optical storage devices, etc) and one or more interfaces 906.

In one embodiment, the machine-readable medium 904 stores instructions which, when executed by the processing circuitry 902, cause the apparatus 900 to: receive a request message from a co-ordination network entity in the communications network, the request message requesting identification information for a plurality of candidate network entities in the communications network capable of performing collaborative learning; identify, from a plurality of network entities registered at the apparatus 900, one or more candidate network entities capable of performing collaborative learning; and transmit an indication of the one or more candidate network entities to the co-ordination network entity.

In other embodiments, the processing circuitry 902 may be configured to directly perform the method, or to cause the apparatus 900 to perform the method, without executing instructions stored in the non-transitory machine-readable medium 904, e.g., through suitably configured dedicated circuitry.

The one or more interfaces 906 may comprise hardware and/or software suitable for communicating with other nodes of the communication network using any suitable communication medium. For example, the interfaces 906 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 906 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the apparatus 900 may comprise power circuitry (not illustrated). The power circuitry may comprise, or be coupled to, power management circuitry and is configured to supply the components of apparatus 900 with power for performing the functionality described herein. Power circuitry may receive power from a power source. The power source and/or power circuitry may be configured to provide power to the various components of apparatus 900 in a form suitable for the respective components (e.g., at a voltage and current level needed for each respective component). The power source may either be included in, or external to, the power circuitry and/or the apparatus 900. For example, the apparatus 900 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 10:
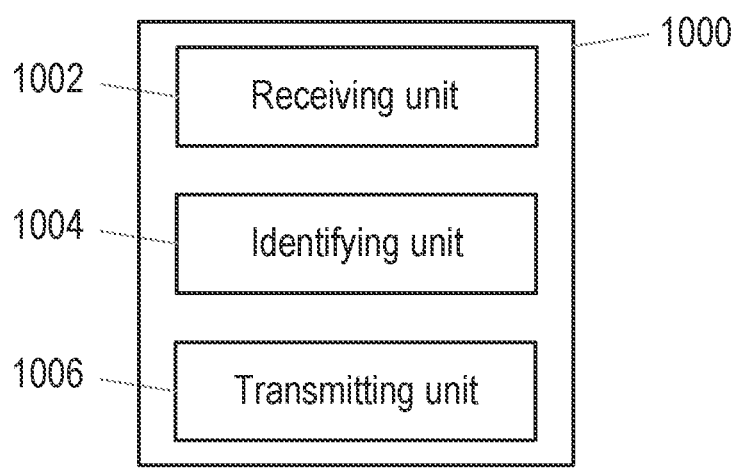

FIG. 10 is a schematic diagram of an apparatus 1000 for a communication network (for example, the system 300 shown in FIG. 3) according to embodiments of the disclosure. The apparatus 1000 may be implemented in a network function or entity (for example, the NRF 310 shown in FIG. 3). Apparatus 1000 is operable to carry out the example method described with reference to FIG. 6 and possibly any other processes or methods disclosed herein. It is also to be understood that the method of FIG. 6 may not necessarily be carried out solely by apparatus 1000. At least some operations of the method can be performed by one or more other entities.

The apparatus 1000 comprises a receiving unit 1002, which is configured to receive a request message from a co-ordination network entity in the communications network, the request message requesting identification information fora plurality of candidate network entities in the communications network capable of performing collaborative learning. The apparatus 1000 further comprises an identifying unit 1004, which is configured to identify, from a plurality of network entities registered at the apparatus, one or more candidate network entities capable of performing collaborative learning. The apparatus 1000 further comprises a transmitting unit 1006, which is configured to transmit an indication of the one or more candidate network entities to the co-ordination network entity.

Apparatus 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1002, identifying unit 1004, transmitting unit 1006, and any other suitable units of apparatus 1000 to perform corresponding functions according one or more embodiments of the present disclosure.

Apparatus 1000 may additionally comprise power-supply circuitry (not illustrated) configured to supply the apparatus 1000 with power.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The embodiments described herein therefore allow for reducing latency, minimising resource overhead and reducing the risk of security problems when implementing machine-learning in communication networks. In particular, the embodiments described herein provide an efficient method for selecting network entities to perform a collaborative learning process, thereby providing a more reliable method for performing collaborative learning in a communications network.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfill the functions of several units recited in the statements. Any reference signs in the statements shall not be construed so as to limit their scope.

The invention claimed is:

1. A method performed by a co-ordination network entity in a communications network, the method comprising:
   transmitting a first request message, from the co-ordination network entity to a network registration entity in the communications network, for identification information for a plurality of candidate network entities in the communications network capable of performing collaborative learning;
   receiving, at the co-ordination network entity, identification information for a plurality of candidate network entities from the network registration entity;
   transmit a second request message comprising at least one query for additional information for the plurality of candidate network entities;
   select, based on one or more responses to the at least one query, one or more network entities from the plurality of candidate network entities; and
   initiating, at the selected one or more network entities from the plurality of candidate network entities, training of a model using a machine-learning algorithm as part of a collaborative learning process.

2. The method of claim 1, wherein the co-ordination network entity is a network data analytics function, NWDAF.

3. The method of claim 1, wherein the network registration entity is a network function repository function, NRF.

4. A co-ordination network entity for a communications network, the co-ordination network entity comprising processing circuitry and a non-transitory machine-readable medium storing instructions which, when executed by the processing circuitry, cause the co-ordination network entity to:
   transmit a first request message, from the co-ordination network entity to a network registration entity in the communications network, for identification information for a plurality of candidate network entities in the communications network capable of performing collaborative learning;

receive, at the co-ordination network entity, identification information for a plurality of candidate network entities from the network registration entity;
transmit a second request message comprising at least one query for additional information for the plurality of candidate network entities;
select, based on one or more responses to the at least one query, one or more network entities from the plurality of candidate network entities; and
initiate, at the selected one or more network entities from the plurality of candidate network entities, training of a model using a machine-learning algorithm as part of a collaborative learning process.

5. The co-ordination network entity of claim 4, wherein the request message comprises one or more criteria for selecting candidate network entities for performing the collaborative learning process.

6. The co-ordination network entity of claim 5, wherein the one or more criteria comprise one or more of:
at least one primary criterion relating to a capability of the candidate network entity to perform the collaborative learning process; and
at least one secondary criterion relating to a capability of the candidate network entity to respond to a type of query.

7. The co-ordination network entity of claim 4, wherein the at least one query for additional information relates to one or more of the following:
a configuration of the candidate network entity;
a performance requirement for the candidate network entity;
an availability of training data at the candidate network entity for training the model; and
a property of training data available at the candidate network entity.

8. The co-ordination network entity of claim 4, wherein one or more of the following applies:
the co-ordination network entity is a network data analytics function, NWDAF; and
the network registration entity is a network function repository function, NRF.

9. The co-ordination network entity of claim 4, wherein one or more of the co-ordination network entity and the network registration entity are in a core network of the communications network.

10. A network registration entity for a communications network, the network registration entity comprising processing circuitry and a non-transitory machine-readable medium storing instructions which, when executed by the processing circuitry, cause the network registration entity to:
receive, at the network registration entity, a request message from a co-ordination network entity in the communications network, the request message comprises one or more criteria for selecting a candidate network entity from the plurality of network entities for training a model using a machine-learning algorithm as part of a collaborative learning process;
identify, from a plurality of network entities registered at the network registration entity, two or more candidate network entities that satisfy the one or more criteria;
store capability information, for each network entity in the plurality of candidate network entities registered at the network registration entity, comprising an indication of whether or not the network entity is configured to respond to a type of query; and
transmit, from the network registration entity, an indication of the two or more candidate network entities to the co-ordination network entity.

11. The network registration entity of claim 10, wherein the one or more criteria comprise one or more of:
at least one primary criterion relating to a capability of the candidate network entity to perform the collaborative learning process; and
at least one secondary criterion relating to a capability of the candidate network entity to respond to a type of query.

12. The network registration entity of claim 11, wherein the type of query includes one or more of the following:
a query related to a configuration of the candidate network entity;
a query related to a performance requirement for the candidate network entity;
a query related to an availability of training data at the candidate network entity for training the model; and
a query related to a property of training data available at the candidate network entity.

13. The network registration entity of claim 10, wherein the stored capability information is stored in a profile for each network entity in the plurality network entities registered at the network registration entity.

14. The network registration entity of claim 13, wherein, for each network entity, the stored capability information further comprises an indication of whether or not the network entity is capable of performing collaborative learning.

15. The network registration entity of claim 10, wherein one or more of the following applies:
the network registration entity is a network function repository function, NRF; and
the co-ordination network entity is a network data analytics function, NWDAF.

16. The network registration entity of claim 10, wherein one or more of the network registration entity and the co-ordination network entity are in a core network of the communications network.

17. A system in a communications network, the system comprising a co-ordination network entity and a network registration entity, wherein the network registration entity comprises first processing circuitry and a first non-transitory machine-readable medium storing instructions which, when executed by the first processing circuitry, cause the network registration entity to:
receive a request message, at the network registration entity from the co-ordination network entity, the request message requesting identification information for a plurality of candidate network entities in the communications network capable of performing collaborative learning, and
identify, from a plurality of network entities registered at the network registration entity, two or more candidate network entities capable of performing collaborative learning;
store capability information, for each network entity in the plurality of candidate network entities registered at the network registration entity, comprising an indication of whether or not the network entity is configured to respond to a type of query; and
wherein the co-ordination network entity comprises second processing circuitry and a second non-transitory machine-readable medium storing instructions which, when executed by the second processing circuitry, cause the co-ordination network entity to:

receive, at the co-ordination network entity, identification information for the two or more candidate network entities from the network registration entity, and initiate, at one or more network entities of the two or more candidate network entities, training of a model using a machine-learning algorithm as part of a collaborative learning process.

18. The network registration entity of claim 10, wherein the one or more criteria comprise at least one primary criterion relating to a capability of the candidate network entity to perform the collaborative learning process.

19. The network registration entity of claim 11, wherein the type of query includes one or more of the following:

a query related to an availability of training data at the candidate network entity for training the model; and a query related to a property of training data available at the candidate network entity.

* * * * *